United States Patent [19]

Sano et al.

[11] Patent Number: 4,520,538

[45] Date of Patent: Jun. 4, 1985

[54] BUCKLE ASSEMBLY

[75] Inventors: Yasumasa Sano, Kanagawa; Tetsuya Ohwada, Chiba, both of Japan

[73] Assignees: NSK-Warner K.K.; Nippon Kinzoku Co., Ltd., both of Japan

[21] Appl. No.: 500,444

[22] Filed: Jun. 2, 1983

[30] Foreign Application Priority Data

Jun. 10, 1982 [JP] Japan .............................. 57-86348[U]

[51] Int. Cl.³ .............................................. A44B 1/18
[52] U.S. Cl. ......................................... 24/682; 24/687; 24/265 R; 24/703; 29/525; 29/526 R; 403/287; 403/315
[58] Field of Search ............... 24/128, 114.5, 163 R, 24/171, 194, 265 R, 265 A, 25 H, 265 BC, 265 EC, 265 CD, 265 EE, 573, 703, 633–650, 682–684, 687–689; 29/451, 509, 525, 526 R; 280/801; 297/468, 483; 403/274, 284, 285, 315, 319, 341, 360, 376

[56] References Cited

U.S. PATENT DOCUMENTS

| | | | |
|---|---|---|---|
| 1,404,260 | 1/1922 | Arnold | 403/DIG. 7 |
| 1,423,785 | 7/1922 | Wilde | 24/128 R X |
| 1,536,738 | 5/1925 | Wirkkala | 403/315 |
| 2,628,855 | 2/1953 | Cushman | 24/645 X |
| 4,373,830 | 2/1983 | Ikesue | 403/284 |

FOREIGN PATENT DOCUMENTS

| | | | |
|---|---|---|---|
| 1067504 | 10/1959 | Fed. Rep. of Germany | 29/509 R |
| 2334388 | 1/1975 | Fed. Rep. of Germany | 24/641 |
| 55-122637 | 9/1980 | Japan | 29/509 |
| 1384064 | 2/1975 | United Kingdom | 24/115 R |
| 1408499 | 10/1975 | United Kingdom | |

*Primary Examiner*—Francis K. Zugel
*Assistant Examiner*—James R. Brittain
*Attorney, Agent, or Firm*—Cantor & Lessler

[57] ABSTRACT

A buckle assembly which comprises a clinched anchor block fixedly connected to a wire and provided with a first interlocking portion at an upper part and a second interlocking portion at a lower part, a buckle base having at least one bottom wall provided with an interlocking portion which is staked with the second interlocking portion, and a support member held on the buckle base and engageable with the first interlocking portion. Owing to the adoption of the above structure, the buckle assembly according to this invention is generally flat and can withstand relatively great loads.

11 Claims, 10 Drawing Figures

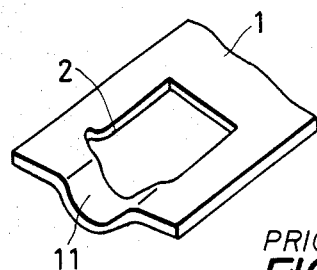
PRIOR ART
FIG. 1
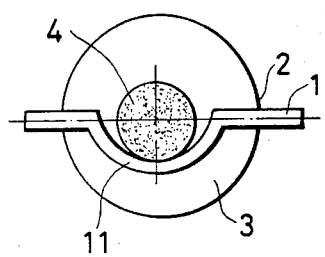
PRIOR ART
FIG. 2
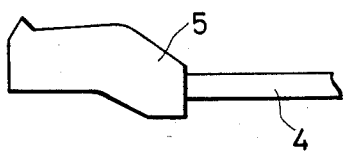
PRIOR ART
FIG. 3
FIG. 5
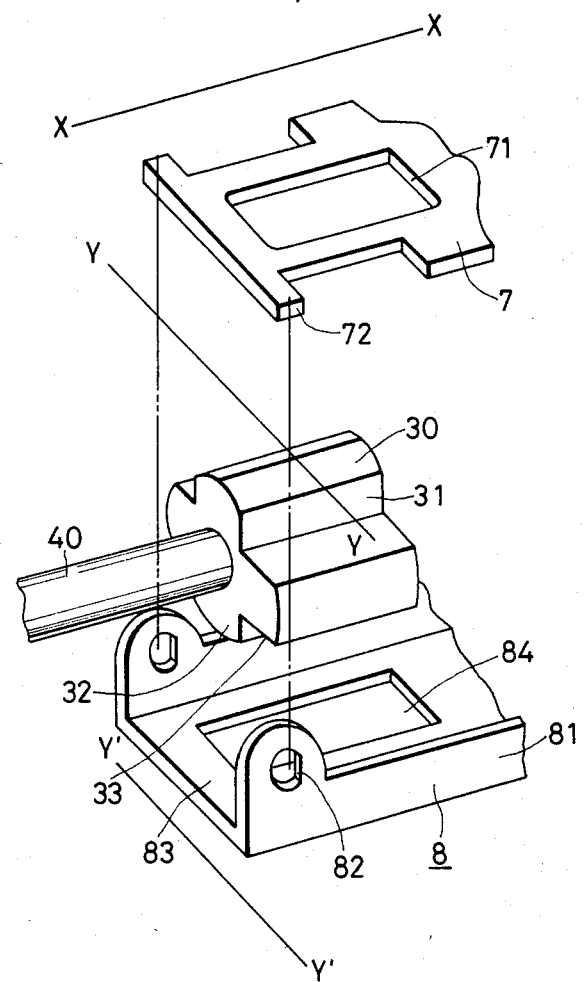

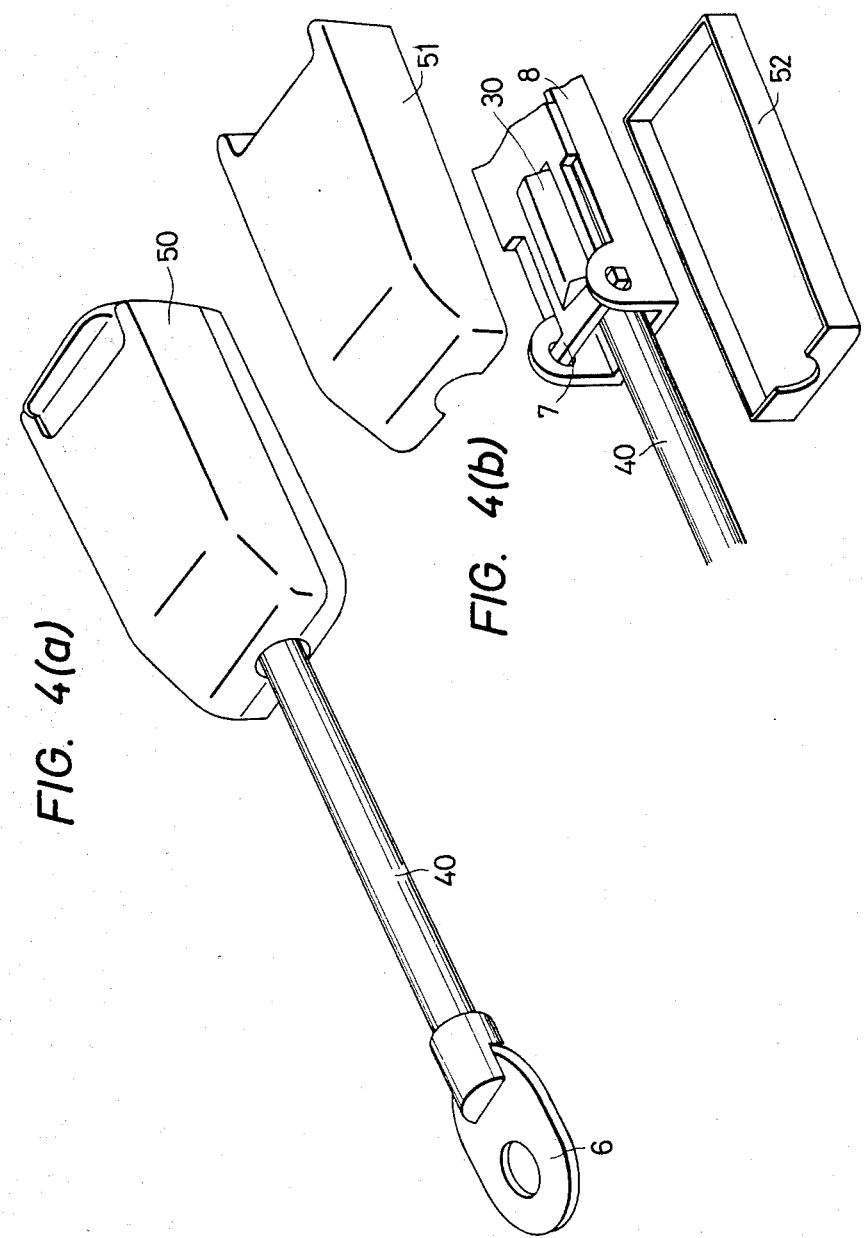

BUCKLE ASSEMBLY

BACKGROUND OF THE INVENTION

(1) Field of the Invention

This invention relates to a buckle assembly, and more particularly to a buckle assembly which is generally planar and includes special support means for its anchor block so as to support the anchor block when an axial load of a predetermined value or greater has been applied to the wire.

(2) Description of the Prior Art

Attachment of a clinched anchor block equipped with a wire to a buckle base has heretofore been carried out by stamping the buckle base and then clinching the anchor block in the thus-stamped portion of the buckle base. This way of attachment is however inevitably accompanied by such inconveniences that possible occurrence of cracks must be carefully watched at the stamped portion of the buckle base as loads are received by the buckle only and the resulting buckle assembly is protruded downwardly at a rear portion thereof as the anchor block projects downwardly.

FIGS. 1 through 3 illustrate such a conventional buckle assembly. FIG. 1 shows a buckle base, which has a window 2 to be combined with its corresponding clinched anchor block and a stamped portion 11. FIG. 2 illustrates the buckle base 1 together with the anchor block 3 clinched thereon, seen from one end of the buckle base 1. Numeral 4 indicates a wire attached to the anchor block 3. The wire 4 is aligned with the stamped portion 11. The resulting buckle assembly is protruded downwardly at a rear portion thereof as illustrated in FIG. 3, because the clinched anchor block 3 projects downwardly in the above conventional buckle assembly.

In order to avoid such a problem as mentioned above, it has also been contemplated to secure a clinched anchor block on a buckle base without clinching the former to the latter at all or excessively. Japanese Utility Model Laid-open No. 139421/1979 filed by the present assignee, NSK Warner K.K. and laid open to the public on Sept. 27, 1979 discloses connecting a clinched anchor block indirectly to the side walls of a base (see, also, U.S. Pat. Nos. 4,065,836—Stephenson and 4,069,557—Loomba). Reference may also be made to U.K. Patent Specification No. 1,408,499 naming Frederick John Setters as a sole inventor and published on Oct. 1, 1975, in which two embodiments are described. According to the first embodiment shown in FIGS. 1 to 3 thereof, the bottom wall of a base is extended and bent upwardly. A window is also extended into the thus-extended portion of the bottom wall. Grooves are formed respectively in the side walls of an anchor block (i.e., ferrule). These grooves are fit over the side edges of the window to secure the anchor block on the buckle base. The other embodiment is illustrated in FIGS. 4 and 5 of the patent, in which keys or ribs are formed on the side walls of a buckle base and grooves formed in the side walls of an anchor block are fit over the keys or ribs. These prior art buckle assemblies may however not be physically strong enough as the anchor blocks are supported at rather limited points or lines.

SUMMARY OF THE INVENTION

An object of this invention is to solve the above-described drawback of the prior art buckle assemblies and thus to provide a buckle assembly which does not require any stamped portion in the base and receives loads by not only the base but also another member such as a plate, rod or the like, in other words, by two members so as to bear such loads equally by the upper parts and lower parts relative to the wire as the center.

Accordingly, this invention provides a buckle assembly which comprises:

a clinched anchor block fixedly connected to a wire and provided with first interlocking means at an upper part thereof and second interlocking means at a lower part thereof;

a buckle base having at least one bottom wall provided with interlocking means which is staked with the second interlocking means; and support means held on the buckle base and engageable with the first interlocking means.

Owing to the adoption of the above-mentioned structure, the buckle assembly according to this invention is generally flat and can withstand relatively great loads.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 1 is a perspective view of a conventional buckle base;

FIG. 2 is a side view of the conventional buckle base combined with a clinched anchor block, seen from the direction of its wire;

FIG. 3 illustrates the outline of the conventional buckle assembly;

FIG. 4(a) is a perspective view of a buckle assembly according to the present invention;

FIG. 4(b) is an exploded fragmentary view of the buckle assembly of FIG. 4(a), in which the buckle covers are taken apart to show the attachment of the anchor block to the buckle base;

FIG. 5 is an exploded fragmentary view of the first embodiment of the buckle assembly according to this invention;

DESCRIPTION OF THE PREFERRED EMBODIMENTS

Figure 6:
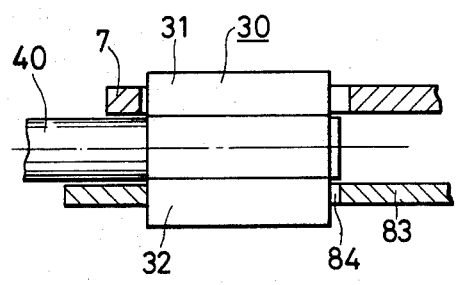
FIG. 6 is a cross-sectional view taken along line X—X of FIG. 5.
Figure 7:
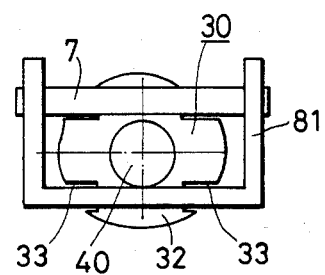
FIG. 7 is a cross-sectional view taken along line Y—Y of FIG. 5.

FIG. 4 illustrates the first embodiment of the buckle assembly according to this invention. FIG. 4(a) shows the external appearance of the buckle assembly, in which numerals 50, 40 and 6 indicate respectively a buckle assembly, wire and anchor plate for connecting the wire to the floor or side body of a vehicle. In FIG. 4(b), an upper cover 51 and lower cover 52 are taken apart respectively upwardly and downwardly so as to show the relative positions of the wire 40, clinched anchor block 30, buckle base 8 and plate 7 fit as support means over the buckle base and clinched anchor block.

FIG. 5 shows the plate 7, clinched anchor block 30 and buckle base 8 of the buckle assembly according to this invention, in an exploded fashion. The wire 40 is attached to the clinched anchor block 30 which is provided with an upper projection 31 serving as first interlocking means and a lower projection 32 serving as second interlocking means. The buckle base 8 is provided with both side walls 81, openings 82 formed through the side walls 81, bottom wall 83 and window 84 formed through the bottom wall 83 for engagement with the lower projection. When assembling these parts, the lower projection 32 is staked on the buckle base 8 after inserting the lower projection 32 of the clinched anchor block 30 in the window 84 and mounting flat surfaces 33 on a bottom wall 83. Then, the plate 7 is placed over the clinched anchor block 30 and both of its side lugs are inserted in their corresponding openings 82. This permits to insertion of the upper projection 31 of the clinched anchor block in a window 71, thereby fitting the plate 7 above the buckle base 8.

FIG. 6 is a cross-sectional view of the thus-formed buckle assembly, taken along line X—X of FIG. 5. The lower projection 32 is inserted in the opening 84 of the bottom wall 83 of the buckle base and staked there. On the other hand, the upper projection 31 is a loose-fit in the window 71 of the plate 7. Thus, the plate 7 is normally kept rotatable about a hypothetical axis extending through the openings 82.

The above rotatable installation of the plate 7 is incorporated so as to make the plate 7 displaceable between a tongue-holding position and a tongue-releasing position, for example, where the plate 7 is a structure member for holding the unillustrated tongue.

If a load is exerted during an emergency such as a vehicle collision, the wire 40 is pulled severely in the axial direction and the upper projection 31 of the clinched anchor block 30 is brought into abutment against the edge of the window 71 of the plate, thereby supporting the clinched anchor block 30 by both of the upper and lower parts.

Since the buckle assembly according to this invention has such a structure as mentioned above, the buckle base 8 does not require any stamped portion and loads are received by not only the buckle base but also the plate 7, i.e., by two members and equally by the upper and lower parts of the buckle assembly relative to the wire.

Figure 9:
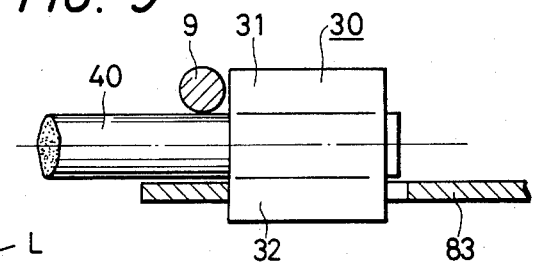
FIG. 9 is a cross-sectional view taken along line L—L of FIG. 8.
Figure 8:
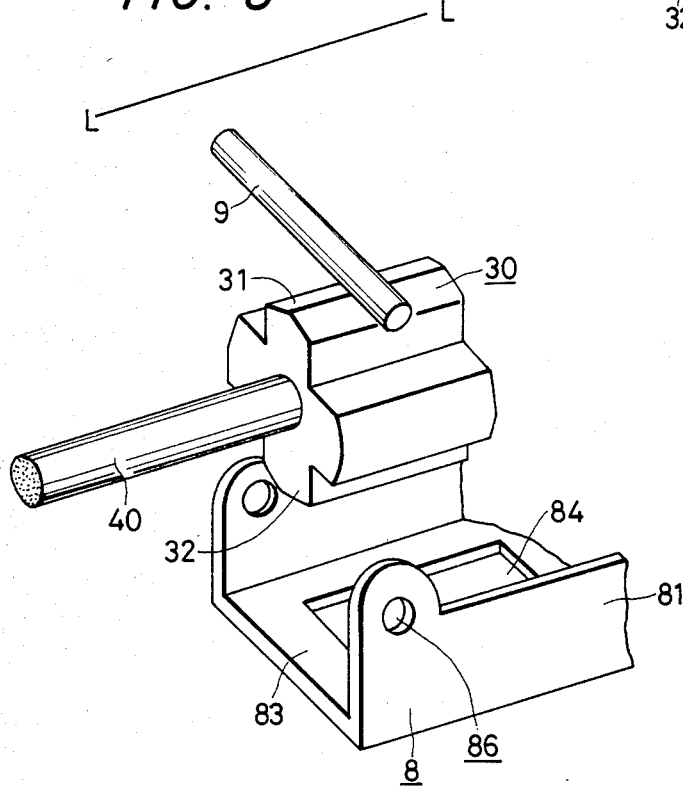
FIG. 8 is an exploded fragmentary view of the second embodiment of the buckle assembly according to this invention.

FIG. 8 illustrates the second embodiment of this invention in an exploded fashion. The structures of the clinched anchor block 30 and buckle base 8 are the same as those shown in FIG. 5. In this second embodiment, a rod 9 is inserted in the openings 86 of the buckle base in place of the plate so as to restrain movements of the clinched anchor block 30 in the pulling direction of the wire 40. FIG. 9 illustrates the parts of FIG. 8 in an assembled state, as a cross-sectional view taken along line L—L of FIG. 8. The lower projection 32 of the clinched anchor block 30 is inserted in the window 84 of the buckle base and staked there. The upper projection 31 of the clinched anchor block 30 is restrained by the rod 9. In this embodiment, loads are born by two members, i.e., the buckle base 8 and rod 9.

Having now fully described the invention, it will be apparent to one of ordinary skill in the art that many changes and modifications can be made thereto without departing from the spirit or scope of the invention as set forth herein.

What is claimed is:

1. A buckle assembly comprising:

a clinched anchor block fixedly secured to a wire and provided with a first interlocking portion at an upper part and a second interlocking portion at a lower part thereof, a buckle base having at least one bottom wall provided with a portion to be engaged with the second interlocking portion, a support means mounted on the buckle base and adapted to engage with the first interlocking portion, and the second interlocking portion being fixedly connected with the portion to be engaged of the buckle base, and the first interlocking portion being maintained in a non-engaged state with respect to the support means;

the clinched anchor block being normally engaged only with the buckle base and the support means movably disposed with respect to the buckle base, whereby the clinched anchor block becomes held both by the buckle base and the support means by the first interlocking portion being engaged with the support means when the wire received a tension exceeding a predetermined value.

2. The buckle assembly as claimed in claim 1, further comprising a pair of side walls extending upwardly from the bottom wall, the support means being mounted on the side walls.

3. The buckle assembly as claimed in claim 2, wherein the support means is formed of a plate defining a window adapted to fit over the first interlocking means with a clearance between the edges of the window which are perpendicular to the axis of the wire and the first interlocking means.

4. The buckle assembly as claimed in claim 1, wherein the support means is movably mounted on the buckle base.

5. The buckle assembly as claimed in claim 4, wherein the support means is formed of a plate defining a window adapted to fit over the first interlocking means with a clearance between the edges of the window which are perpendicular to the axis of the wire and the first interlocking means.

6. The buckle assembly as claimed in claim 4, further comprising a pair of side walls extending upwardly from the bottom wall, the support means being pivotally mounted on the side walls.

7. The buckle assembly as claimed in claim 1, wherein the clinched anchor block has flat surfaces extending from the second interlocking means in directions perpendicular to the axis of the wire and the flat surfaces are kept in contact with the bottom wall of the buckle base.

8. The buckle assembly as claimed in claim 1, wherein said portion of said bottom wall is a window.

9. The buckle assembly as claimed in claim 1, wherein said anchor block is cruciform in transverse cross-section and said wire is secured to said anchor block longitudinally thereof.

10. The buckle assembly as claimed in claim 1, wherein the second interlocking portion is fixedly connected with said portion of said buckle base by staking.

11. The buckle assembly as claimed in claim 1, wherein the support means serves as a reinforcing means for holding a buckle tongue and is movable between a first tongue-securing position and a second tongue-releasing position.

* * * * *